G. F. Rice,

Boring Mach.

No. 3574. Reissued Aug. 3. 1869.

Witnesses
Thos. H. Dodge
Albert E. Pierce.

Assignee of Inventor
Emory S. Bates

N. PETERS, PHOTO-LITHOGRAPHER, WASHINGTON, D. C.

United States Patent Office.

EMORY L. BATES, (ASSIGNEE OF GEORGE F. RICE,) OF FISKEDALE, MASSACHUSETTS.

*Letters Patent No.* 22,379, *dated December* 21, 1858; *reissue No.* 3,574, *dated August* 3, 1869.

IMPROVEMENT IN BORING-MACHINE.

The Schedule referred to in these Letters Patent and making part of the same.

*To all whom these presents shall come:*

Be it known that GEORGE F. RICE, of Worcester, in the county of Worcester, and State of Massachusetts, did invent a new and useful Improvement on the Boring-Machine commonly used by carpenters and builders, of which the following is a full, clear, and exact description of the construction and operation of the same, reference being had to the accompanying drawings, making a part of this specification, in which—

Figure 1:
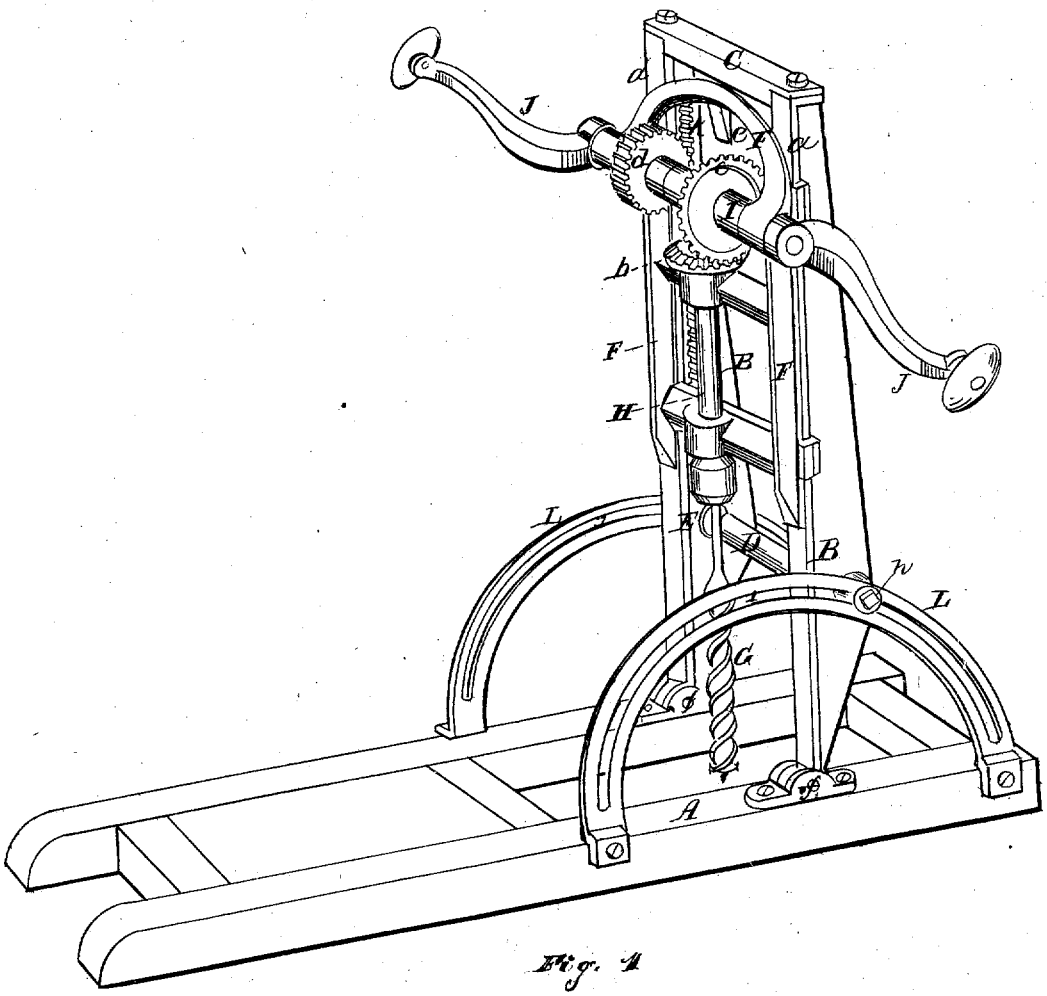
Figure 2:
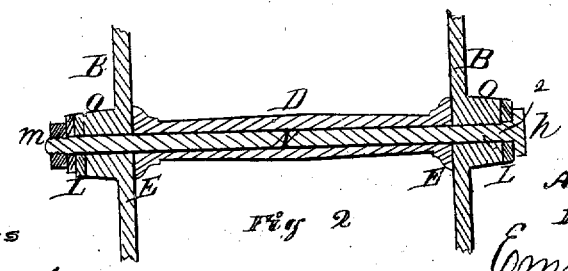

Figure 1 represents a perspective view of said RICE's improved boring-machine, and Figure 2 represents a vertical section of a part of the same, taken through the centre of the holding or clamping-device, as will be hereafter explained.

Same letters indicate like parts in both figures.

To enable those skilled in the art to which the said improvement belongs to make and use the same, I will describe the said RICE's invention more in detail, the nature of which invention consists in certain improvements in angle boring-machines, as will be hereinafter explained.

In the accompanying drawings—

A represents the bed-piece, or bottom of the machine, to which the lower ends of the sides, or uprights B B are hinged, as indicated in the drawings.

The side pieces or uprights B B are united at the top by a cross-piece, C, and are braced and supported, near their lower ends, by an inner brace or support D, which is made hollow, and is provided with a flange, or shoulder, E, at each end, to abut against the inner sides of the upright pieces B B.

The auger-frame F is fitted to slide up and down on the ways *a a*, to admit of the raising or lowering of the auger, as the case may be.

The auger G is fitted in a socket in the lower end of the spindle H, and may be held in place by a set-screw.

Spindle H is supported in proper bearings in the frame F, and has secured on its upper end a bevel-gear, *b*, which meshes with the bevel-gear *c*, on the shaft I, which turns in proper bearings in frame F, and is provided with cranks J J, by means of which the operator, through shaft I, bevel-gears *c* and *b*, gives the proper motion to the spindle H and auger G, either for boring or withdrawing the auger.

To accomplish the latter operation, the operator slides the spur-gear *d* out on shaft I until it gears into rack K, secured to the side of one of the uprights; after which, by a proper motion of the cranks, gear *d* will be run up the rack, thereby elevating the auger-frame and auger.

Gear *d* is fitted to shaft I by means of a spline and slot, so that while the gear can be slipped on the shaft I, to throw it in and out of the rack K, it must always turn with shaft I.

Frame F is held up by means of catch-spring *e*, fastened to the top or cross-piece C.

Two slotted semicircle-pieces, L L, are fastened to the bed-frame in such a manner that their curved slots, 1, will be equidistant from the axis of motion of the uprights, when they are moved backward or forward on their hinges *f f*.

D is a brace or support, arranged between the uprights, near their lower ends, so that its shoulders or flanges E E will abut against the insides of the uprights.

Brace D is made hollow, and a bolt, N, is passed through the slots 1 1 in the semicircles, the uprights B B, and brace D, as fully indicated in the drawings.

Bolt N is provided with a head, *h*, to press against one of the semicircles, and with a square-headed part, 2, to fit the slot 1 in the semicircle, which prevents the bolt from turning when nut *m*, on the other end, is turned, to clamp the uprights to the semicircles.

The hubs or projections O O, on the uprights B B, serve the purpose of washers, to fill the spaces between the outer sides of the uprights and the semicircle-pieces, whereby all friction, rubbing, and binding of the sides of the uprights against the semicircles is avoided, when the uprights are moved back and forth, in adjusting the auger for boring holes at different angles.

It will be seen, from the foregoing description, that when it is desired to adjust the auger for boring at different angles, all that is necessary to do, is to loosen nut *m*, when the uprights, together with the auger-frame, can be swung forward or back, as the case may be, bolt N sliding in the slots 1 1, in the semicircles or guides L L.

By combining the clamping-device with the uprights and semicircles, so that when the uprights are clamped to the former, they will also be forced against the shoulders or flanges of a central brace or support, a much stronger and more desirable angle-machine is produced than the old style of machine, which was made with a clamping-bolt for each side, no central brace or support being combined with the clamping-devices.

Having described the said RICE's improvements in machines for boring wood,

What is claimed, and desired to have secured by Letters Patent, as the invention of the said GEORGE F. RICE, is—

1. The combination, with the hinged uprights of a boring-machine, of clamping and bracing-mechanism, constructed substantially as described, whereby the lower ends of the uprights are clamped to a central brace or support, at the same time, and by the same mechanism, by which they are clamped to their curved ways or guides.

2. A hollow cross-brace or support, in combination with the uprights, substantially as and for the purposes set forth.

3. The combination, with the side pieces or uprights, semicircles, and centre-brace, of a double-headed bolt, substantially as and for the purposes set forth.

EMORY L. BATES.

Witnesses:
THOS. H. DODGE,
ALBERT E. PEIRCE.